April 29, 1958　　A. E. THORPE　　2,832,404
LIQUID FUEL BURNERS

Original Filed Aug. 5, 1949　　2 Sheets-Sheet 1

Inventor:
ALFRED ERIC THORPE

By
Richardson, David and Nordon
Attorneys

April 29, 1958     A. E. THORPE     2,832,404
LIQUID FUEL BURNERS
Original Filed Aug. 5, 1949     2 Sheets-Sheet 2

Inventor:
ALFRED ERIC THORPE

By
Richardson, David and Nerdon
Attorneys.

United States Patent Office 2,832,404
Patented Apr. 29, 1958

2,832,404

LIQUID FUEL BURNERS

Alfred Eric Thorpe, Sutton Coldfield, England

Original application August 5, 1949, Serial No. 108,695, now Patent No. 2,730,168, dated January 10, 1948. Divided and this application August 4, 1955, Serial No. 526,525

4 Claims. (Cl. 158—88)

This invention has reference to a liquid fuel burner of the kind consisting of an annular trough or bowl having inner and outer walls made of thermally conductive material for containing a cylindrical kindler, controllable means for supplying the annular trough with liquid fuel from a supply source and a support at the upper end of the bowl upon which a perforated drum or shell, or so-called generator, is adapted to rest, this generator being supplied from below with air for combustion.

When such burners are in use, it is found that uncontrolled combustion takes place in the vaporising zone due to the high temperature obtaining in the burner bowl and kindler and as a result the kindler becomes unduly carbonised and a carbon deposit forms on the wall of the bowl, this carbonisation and/or deposit not only reducing the efficiency of the burner but calling for frequent servicing of the burner and replacement of the kindler at an earlier period in its life than should be necessary.

The present invention is a division of my Letters Patent No. 2,730,168 and it has for its primary object to provide a simple, efficient and inexpensive construction of the liquid fuel burner in which the above disadvantages are removed or minimised.

Accordingly, the present invention consists of a liquid fuel burner having the combination of parts hereinafter described with reference to the annexed drawing and specification claimed.

The invention will now be described with reference to the accompanying drawings, wherein.

Figure 1:
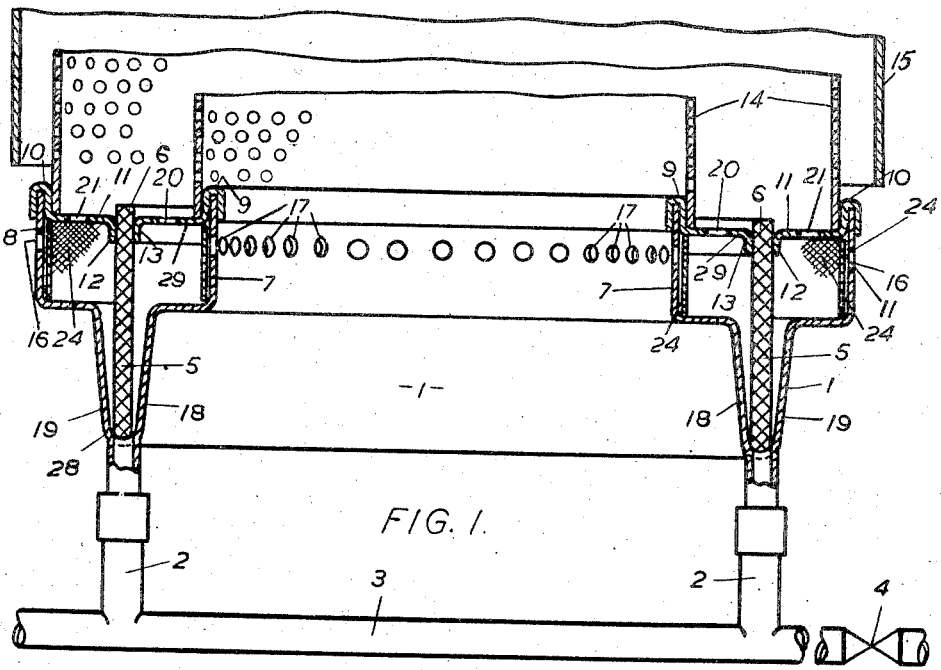
Figure 1 is a vertical section of the burner supporting a perforated drum.

As will be seen from the drawings, the liquid fuel burner comprises an annular trough or bowl 1, of thermally conductive material, connected at its base to vertical branches 2 of a liquid fuel supply pipe 3 normally communicating with a storage tank, the supply of fuel to the pipe 3 being controlled by a suitable valve indicated at 4. The spaced inner and outer annular walls 18, 19 of the trough diverge from the base 28 and house an annular kindler 5 which rests on the base part 28 whereas the inner and outer cylindrical surfaces of the kindler 5 are spaced from the inner sides of the walls 18, 19. The divergent walls 18, 19 are flared at their upper end portions so as to terminate in a cylindrical cup having an inner wall 7 and an outer wall 8 which are concentric with the axis of the trough 1 and into which cup extends the combustion end 6 of the kindler 5. An outer ring member 10 has an inwardly extending flange portion 11 and a central opening 12 therein, this ring member being concentric with the said trough 1 and having a down turned hook which engages and is supported by the upper end of the outer wall 8 of the said cup. An inner ring member 9 having an outwardly extending flange portion 29 and a circular periphery 13 concentric with the said trough has a similar down turned hook which engages and is supported by the upper end of the inner wall 7 of the said cup. The central circular opening 12 and the circular periphery 13 are spaced apart so as to define an annular opening therebetween communicating with the space between the upper end portions of the said cup and this opening is occupied by the combustion end 6 of the kindler. Preferably, the said annular opening at 12, 13 is defined by downwardly extending flanges which embrace and support the combustion end 6. The flange portions 11, 29 of the ring members 9, 10 support the base of a generator comprising spaced concentric tubes of which the inner tubes 14 are perforated and the outer tube 15 is imperforate.

The inner and outer walls 7, 8 of the cup have rings of perforations 16, 17 for the admission of air and the inner and outer ring members 9, 10 have rings of perforations 20, 21 for the escape of air. In Fig. 1, the inlet perforations 16, 17 are in the side walls 7, 8 and in Fig. 2 they are in the base of the cup, whereas in Fig. 3 the air admission is by means of vent pipes 25 connected to the outer walls 19 above the normal liquid fuel level and near the top of the trough 1.

In Fig. 1, the air draught, which will be induced by the performations 16, 17 dissipates heat from the cupwalls 7, 8, circulates through the inside of the cup, and cools the upper part of the kindler and on passing through the perforations 20, 21 supplies primary air for combustion. The ring members 9, 10 operate as heat baffles.

Figure 2:
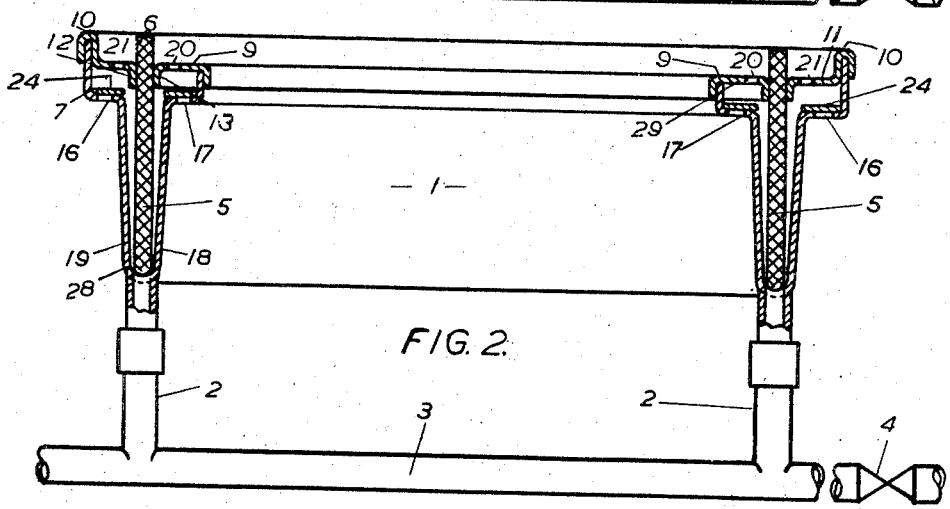
Fig. 2 is a vertical section similar to Fig. 1 of a modified burner less the drum.

In Fig. 2, the inlet perforations 16, 17 operate to induce air to circulate over the exterior of the walls 18, 19 of the trough 1 so as to dissipate heat and keep the kindler 5 cool, by circulating in the cup and passing out through the perforations 20, 21, the upper part of the kindler is cooled and primary air is supplied for combustion. Again the ring members 9, 10 operate as heat baffles.

The inlet perforations 16, 17, are preferably protected by fine mesh wire gauze 24 as a preventative measure against the burner firing back.

Figure 3:
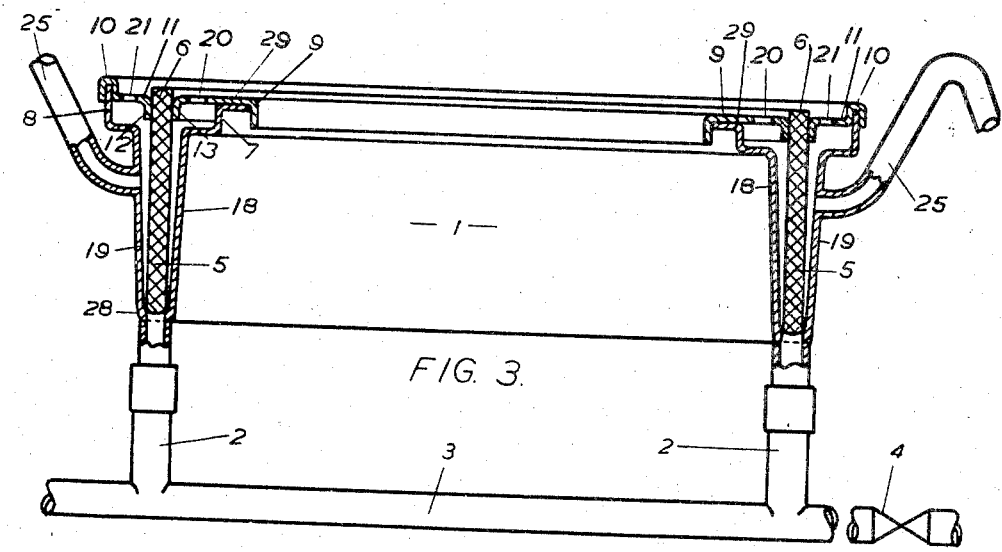
Fig. 3 is a vertical section similar to Fig. 1 of another modified burner less the drum.

It will be appreciated on referring to Fig. 3 that the heat generated by the burner induces cool air to flow through the vent tubes 25 directing into the upper part of the trough and around the upper part of the kindler 5 so as to dissipate heat prior to the air escaping through the perforations 20, 21 as primary air for combustion.

It will also be appreciated that under normal burning conditions, the divergent walls of the trough prevent the cylindrical surfaces of the kinder being in physical contact with the thermal conductive walls of the trough, as the cross section of the latter increases in its upward direction, therefore thermal conductivity through the fuel in the trough will be on a reduced scale; moreover, the air flow induced by the air inlets in the cup and the outlets in the ring members will cause a mild circulation of air around the upper part of the kindler which will reduce the tendency of carbonisation at the combustion end of the kindler.

I claim:

1. A burner for liquid fuels, comprising an annular fuel trough having spaced inner and outer upwardly divergent walls extending from the base thereof and formed of thermally conductive material, said walls being further divergently flared at their upper end portions into the form of annular cup, an outer ring member comprising an inwardly extending flange portion having a circular central opening therein concentric with said trough, said outer ring member being supported by said outer wall of said cup at the upper end thereof; an inner ring member comprising an outwardly extending flange portion having a circular periphery concentric with said trough and spaced from said central opening in said outer ring member to define an annular opening therebetween communicating with space between said flared upper end portions of said walls, said inner ring member being supported by said inner wall of said cup at the upper end thereof with its flange portion generally in the same plane as the flange portion of said outer ring member; a cylindrical kindler disposed in said trough with its lower part supported by the base of said trough, said kindler extending upwardly through said annular opening and in contact with the edges of said ring members adjacent to said opening; vent means in said cup-walls and further vent means in said ring members, said vent means in said cup-walls communicating with space between said flared portions of said cup-walls and around the upper portion of said kindler.

2. A burner acccording to claim 1, wherein the inner and outer ring members have down turned hooks which respectively engage the rims of said flared walls.

3. A burner for liquid fuels, comprising an annular fuel trough having spaced inner and outer upwardly divergent walls extending from the base thereof and formed of thermally conductive material, said walls being further divergently flared at their upper end portions into the form of an annular cup, an outer ring member comprising an inwardly extending flange portion having a circular central opening therein concentric with said trough, said outer ring member being supported by said outer wall of said cup at the upper end thereof; an inner ring member comprising an outwardly extending flange portion having a circular periphery concentric with said trough and spaced from said central opening in said outer ring member to define an annular opening therebetween communicating with space between said flared upper end portions of said walls, said inner ring member being supported by said inner wall of said cup at the upper end thereof with its flange portion generally in the same plane as the flange portion of said outer ring member; a cylindrical kindler disposed in said trough with its lower part supported by the base of said trough, said kindler extending upwardly through said annular opening and in contact with the edges of said ring members adjacent to said opening, vent tube means communicating with a wall of said fuel trough and further vent means in said ring members, said vent means in said trough communicating with the space between said flared portions of said cup-walls and around the upper portion of said kindler.

4. A burner for liquid fuels, comprising an annular fuel trough having spaced inner and outer upwardly divergent walls extending from the base thereof and formed of thermally conductive material, said walls being further divergently flared at their upper end portions into the form of annular cup, an outer ring member comprising an inwardly extending flange portion having a circular central opening therein concentric with said trough, said outer ring member being supported by said outer wall of said cup at the upper end thereof; an inner ring member comprising an outwardly extending flange portion having a circular periphery concentric with said trough and spaced from said central opening in said outer ring member to define an annular opening therebetween communicating with space between said flared upper end portions of said walls, said inner ring member being supported by said inner wall of said cup at the upper end thereof with its flange portion generally in the same plane as the flange portion of said outer ring member; a cylindrical kindler disposed in said trough with its lower part supported by the base of said trough, said kindler extending upwardly through said annular opening and in contact with the edges of said ring members adjacent to said opening; vent means in the base of said cup, and further vent means in said ring members, and vent means in said base communicating with space between said base and around the upper portion of said kindler.

No references cited.